(12) United States Patent
Mitsuzawa et al.

(10) Patent No.: US 8,768,684 B2
(45) Date of Patent: Jul. 1, 2014

(54) APPARATUS, METHOD AND PROGRAM FOR PROCESSING INFORMATION

(75) Inventors: Atsushi Mitsuzawa, Kanagawa (JP); Yuji Matsuyama, Tokyo (JP); Toshihiko Kawai, Kanagawa (JP)

(73) Assignee: Sony Corporation (JP)

( * ) Notice: Subject to any disclaimer, the term of this patent is extended or adjusted under 35 U.S.C. 154(b) by 134 days.

(21) Appl. No.: 12/800,178

(22) Filed: May 10, 2010

(65) Prior Publication Data

US 2010/0299130 A1  Nov. 25, 2010

(30) Foreign Application Priority Data

May 25, 2009  (JP) ................. P2009-125206

(51) Int. Cl.
*G06F 9/455*  (2006.01)

(52) U.S. Cl.
USPC ........................................................ 703/26

(58) Field of Classification Search
USPC ........................................................ 703/26
See application file for complete search history.

(56) References Cited

U.S. PATENT DOCUMENTS

| | | | |
|---|---|---|---|
| 6,397,242 B1 | 5/2002 | Devine et al. | |
| 7,389,403 B1 | 6/2008 | Alpert et al. | |
| 2004/0098419 A1* | 5/2004 | Bantz et al. | 707/203 |

FOREIGN PATENT DOCUMENTS

| | | |
|---|---|---|
| EP | 2048578 A2 | 4/2009 |
| WO | 2009027153 A1 | 3/2009 |

OTHER PUBLICATIONS

Dias et al. "Dynamic Evolution in Workflow Management Systems" 2003 iEEE.*
Chahal, Sudip et al., Intel Corporation, "Testing Live Migraton with Intel® Virtualization Technology FlexMigration", Jan. 2009, 12 pages.
Serebrin, Ben, CPU Virtualization Architect, AMD, "Cross-Vendor Migration: What do you mean my ISA isn't compatible?", Xen Summit, Feb. 2009, 3 pages.
European Search Report EP 10162652, dated Mar. 8, 2012.

* cited by examiner

*Primary Examiner* — Saif Alhija
(74) *Attorney, Agent, or Firm* — Lerner, David, Littenberg, Krumholz & Mentlik, LLP

(57) ABSTRACT

Apparatus and method for processing information may determine whether a migration condition exists by a source information processing unit executing a program. When a migration condition is determined to exist by the source information processing unit, a destination information processing unit may determine whether an instruction to be executed of the program is a predetermined instruction. The instruction to be executed is converted by an instruction emulator, when a result of a determination by the destination information processing unit is the predetermined instruction.

15 Claims, 13 Drawing Sheets

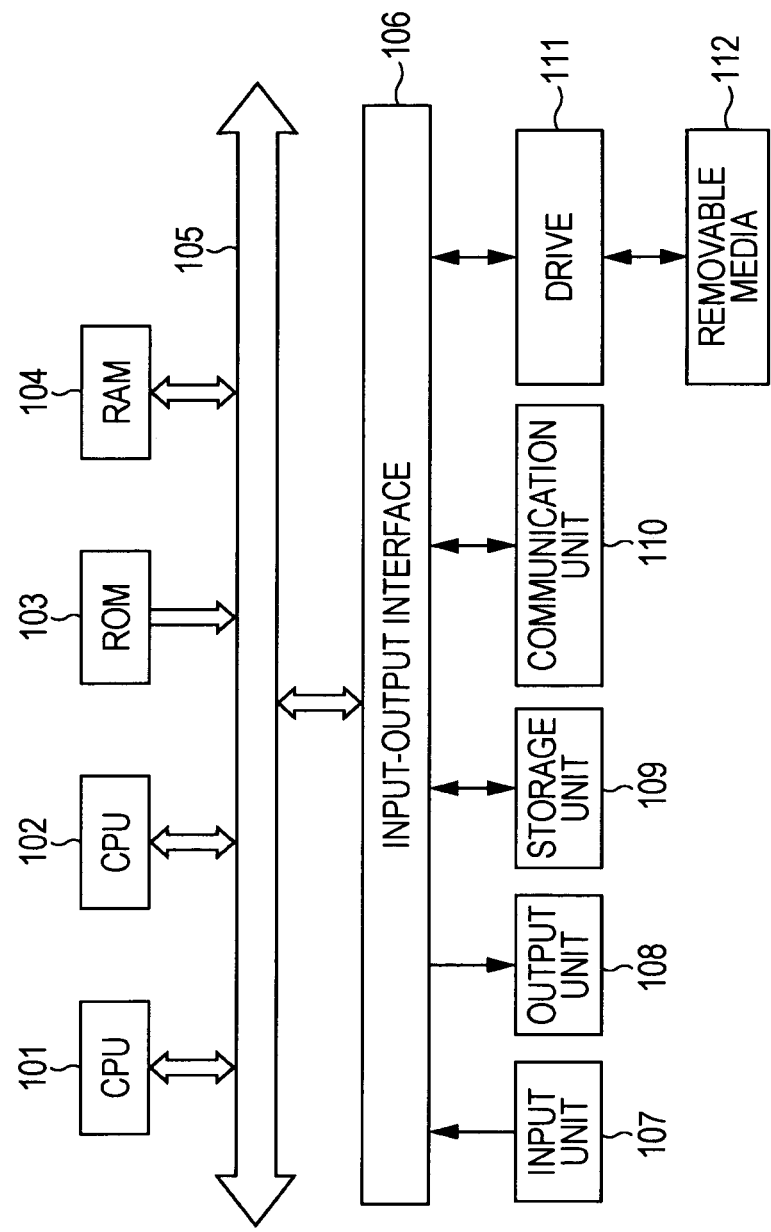

APPARATUS, METHOD AND PROGRAM FOR PROCESSING INFORMATION

CROSS-REFERENCE TO RELATED APPLICATION

The present application claims priority from Japanese Patent Application No. JP 2009-125206 filed in the Japanese Patent Office on May 25, 2009, the entire content of which is incorporated herein by reference.

BACKGROUND OF THE INVENTION

1. Field of the Invention

The present invention relates to an apparatus, a method, and a program for processing information and, in particular, to an apparatus, a method, and a program for efficiently executing a program subject to migration of the program.

2. Description of the Related Art

Program migration, such as program movement or a program conversion process, is typically used.

Available as a related art technique for executing migration is an emulation method such as QEMU (Registered Trademark of Fabrice Bellard).

Other techniques are also disclosed in Ben Serebrin, "Cross-vendor migration: What do you mean my ISA isn't comptabile?", Xen Summit, February 2009, and FlexMigration (Intel/DOC-2538, retrieved Apr. 23, 2009 through the Internet).

SUMMARY OF THE INVENTION

The needs described below are not sufficiently satisfied if the above-described related art techniques are merely applied.

There is currently a growing necessity to execute migration of a currently running program between central processing units (CPUs) of different types, for example, a high-end CPU and a low-power consuming CPU. Program migration includes a program movement and a conversion process). Such a need is not sufficiently satisfied.

It is thus desirable to execute efficiently a program prior to and subsequent to the program migration.

In accordance with an aspect of the invention, an apparatus for processing information includes a source information processing unit to determine whether a migration condition exists when executing a program; and a destination information processing unit to determine whether an instruction to be executed of the program is a predetermined instruction, when a migration condition is determined to exist by the source information processing unit.

In accordance with another aspect of the invention, a method for processing information includes determining whether a migration condition exists by a source information processing unit executing a program; and when a migration condition is determined to exist by the source information processing unit, determining by a destination information processing unit whether an instruction to be executed of the program is a predetermined instruction.

In accordance with another aspect of the invention, a system for executing a program includes a source information processing unit having a processing capability to implement a first instruction set and operable to execute the program; and a destination information processing unit having a processing capability to implement a second instruction set. The first instruction set includes at least one instruction common to the second instruction set and at least one instruction not common to the second instruction set. The destination information processing unit is operable to determine whether an instruction to be executed of the program is common or not common to the second instruction set. The instruction to be executed is converted by an instruction emulator only when the instruction to be executed is not common to the second instruction set. The instruction to be executed is executed through a processing capability of the destination information processing unit when the instruction to be executed is common to the second instruction set.

The program is thus efficiently executed subsequent to the migration thereof.

BRIEF DESCRIPTION OF THE DRAWINGS

FIG. 15 is a block diagram illustrating a computer included in or driving an information processing apparatus in accordance with one embodiment of the present invention.

DESCRIPTION OF THE PREFERRED EMBODIMENTS

Figure 1:
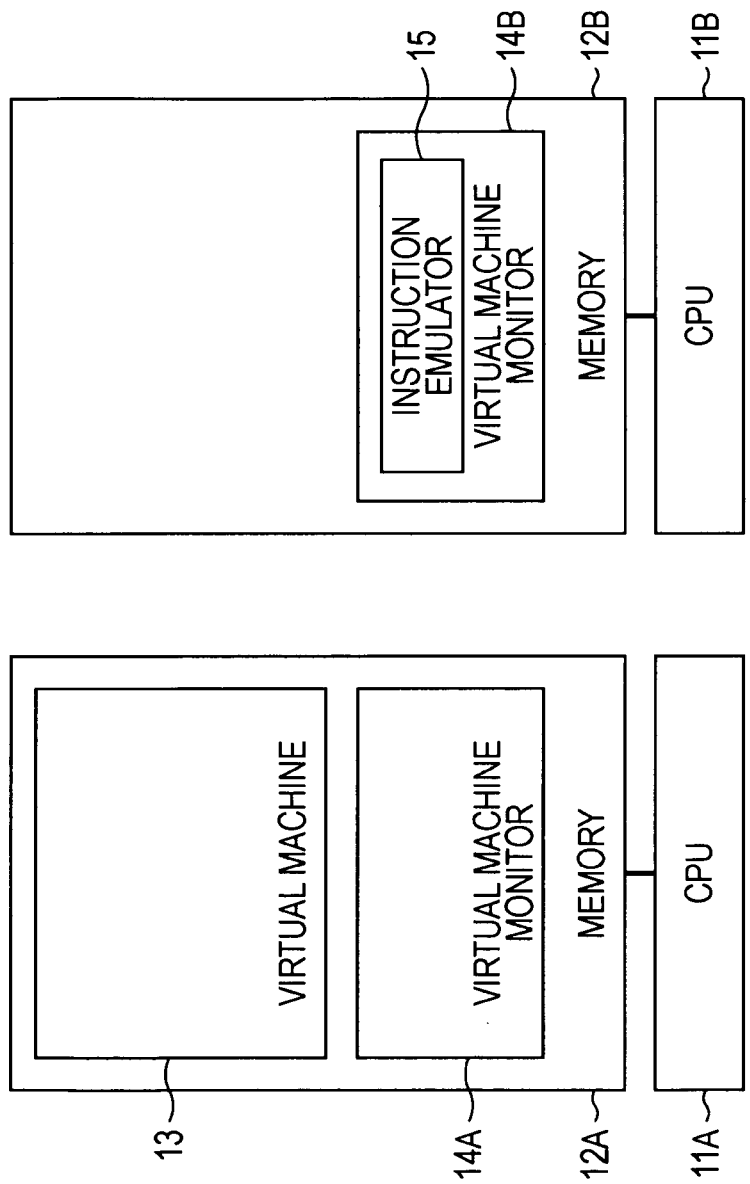
FIG. 1 is a block diagram illustrating an information processing apparatus of a first embodiment of the present invention.

To help understand the present invention, related art is summarized first. Information processing apparatuses of three embodiments of the present invention (first through third embodiments) are then described.

1. Related Art

The emulation technique is available as a related-art technique for executing program migration as previously described.

With the emulation technique, a program to be executed by a CPU A implementing an instruction set A is executed by a CPU B implementing an instruction set B different from the instruction set A. More specifically, an instruction of the instruction set A is converted into an instruction of the instruction set B. The CPU B can thus execute the program in accordance with an instruction of the converted instruction set B.

The emulation technique has the advantage that the instruction of the instruction set A can be executed by the CPU B implementing the instruction set B completely different from the instruction set A.

The emulation technique takes long process time to convert an instruction of the instruction set A into an instruction of the instruction set B. The conversion process time is as long as or longer than time to execute the converted instruction set B. The migration process based on the emulation technique can substantially slow the execution of a program on the CPU B.

Although the instruction set A and the instruction set B commonly share major instructions, the two instruction sets are still partially different from each other. Even in such a case, the emulation technique converts all the instructions of the instruction set A into instructions of the instruction set B.

If the instruction set A and the instruction set B commonly share major instructions with a partial difference in the other instructions therebetween, the use of the emulation technique is not efficient.

It is also desirable to embody a virtual machine based on virtual technique, and to execute migration of the virtual machine.

The virtual technique refers to a technique of generating a virtual hardware structure using software and running a software application program on the virtual hardware structure.

The virtual machine refers to a set of software and data for causing an operating system (OS) or an application software program to operate like a physical computer. The virtual machine includes a variety of virtual devices having functions equivalent to those of a central processing unit (CPU), a memory, a hard disc drive (HDD), and a network controller.

The virtual machine is created on a physical hardware structure, and controlled by a virtual machine monitor, such as VMware (Registered Trademark of VMware, Inc.) or Xen (Registered Trademark of XenSource, Inc.).

The migration of the virtual machine refers to a movement of the virtual machine from one virtual machine monitor to another virtual machine monitor.

The virtual machine implements the same instruction set as the instruction set of a physical CPU. It is difficult to migrate merely a virtual machine being operated by a CPU A implementing an instruction set A to a CPU B implementing an instruction set B.

Another technique of migrating a program is disclosed in Ben Serebrin, "Cross-vendor migration: What do you mean my ISA isn't comptabile?", Xen Summit, February 2009. The disclosed technique executes migration between CPUs developed by different vendors. The disclosed technique allows a program to migrate anyway between CPUs commonly sharing a major instruction set but still with a partial instruction difference therebetween in the other instructions. If a system include a high-end CPU and a low-end CPU, an extended instruction present only on the high-end CPU remains unused. Even with the disclosed technique, the high-end CPU has difficulty achieving an originally intended performance.

FlexMigration <URL:http://communities.intel.com/openport/docs/DOC-2538> (retrieved via the Internet, Apr. 23, 2009) discloses a hardware structure called FlexMigration manufactured by Intel Corporation. The hardware permits migration between CPUs of different generations by making a new generation CPU look like an old generation CPU. If an extended instruction causing a new-generation CPU to perform a high-end operation is added, FlexMigration has difficulty in using the extended instruction. The new-generation CPU fails to achieve an originally intended performance.

AMD has proposed a hardware product called AMD Virtualization as another technique of program migration. As FlexMigration, AMD-V (virtualization) also makes a new-generation CPU look like an old-generation CPU in order to migrate a program between CPUs of different generations.

As with FlexMigration, the new-generation CPU has difficulty in achieving an originally intended performance in AMD-V.

The inventor of this invention has invented a technique that executes, efficiently and with an originally intended performance maintained, program migration between CPUs commonly sharing major instructions but still with a part of the other instructions being different. The CPUs may be different in generation or may be manufactured by different vendors. Information processing apparatuses incorporating such a technique are described below as three embodiments of the present invention.

2. First Embodiment

FIG. 1 is a block diagram illustrating an information processing apparatus of a first embodiment of the present invention.

In this specification, the word system refers to a whole system including a plurality of units, and a processing unit. More specifically, the information processing apparatus illustrated in FIG. 1 may be constructed of a plurality of units housed in separate cases. In accordance with the first embodiment, however, the information processing apparatus is a single unit housed in a single case.

The information processing apparatus illustrated in FIG. 1 includes a CPU 11A and a memory 12A connected to the CPU 11A. The memory 12A includes a virtual machine 13 and a virtual machine monitor 14A.

The information processing apparatus illustrated in FIG. 1 further includes a CPU 11B and a memory 12B connected the CPU 11B. The memory 12B includes a virtual machine monitor 14B. The virtual machine monitor 14B includes an instruction emulator 15.

The CPU 11A implements an instruction set A. The CPU 11B implements an instruction set B.

The instruction set A and the instruction set B commonly share major instructions. The instruction commonly shared by the instruction set A and the instruction set B is referred to as a common instruction. The instruction set A includes an instruction that is absent in the instruction set B, and that instruction is referred to as an instruction X. The instruction set B includes the common instruction but does not include the instruction X.

The virtual machine 13 includes a program composed of an instruction of the instruction set A. The program of the virtual machine 13 is executed through the capability of the CPU 11A connected to the memory 12A including the virtual machine 13.

The virtual machine monitors 14A and 14B are constructed as a program that provides the virtual machine 13 with an execution environment not dependent on hardware.

The instruction emulator 15 is a program having a function of converting the instruction X present in the instruction set A but absent in the instruction set B into an instruction of the instruction set B. The operation of the instruction emulator 15 is described later with reference to FIG. 2.

Referring to FIG. 1, the virtual machine 13 under the control of the virtual machine monitor 14A operates on the memory 12A. The program of the virtual machine 13 is executed through the capability of the CPU 11A implementing the instruction set A.

The structure of the information processing apparatus of the first embodiment has been discussed with reference to FIG. 1. The migration of the virtual machine 13 is described below with reference to FIG. 2.

Figure 2:
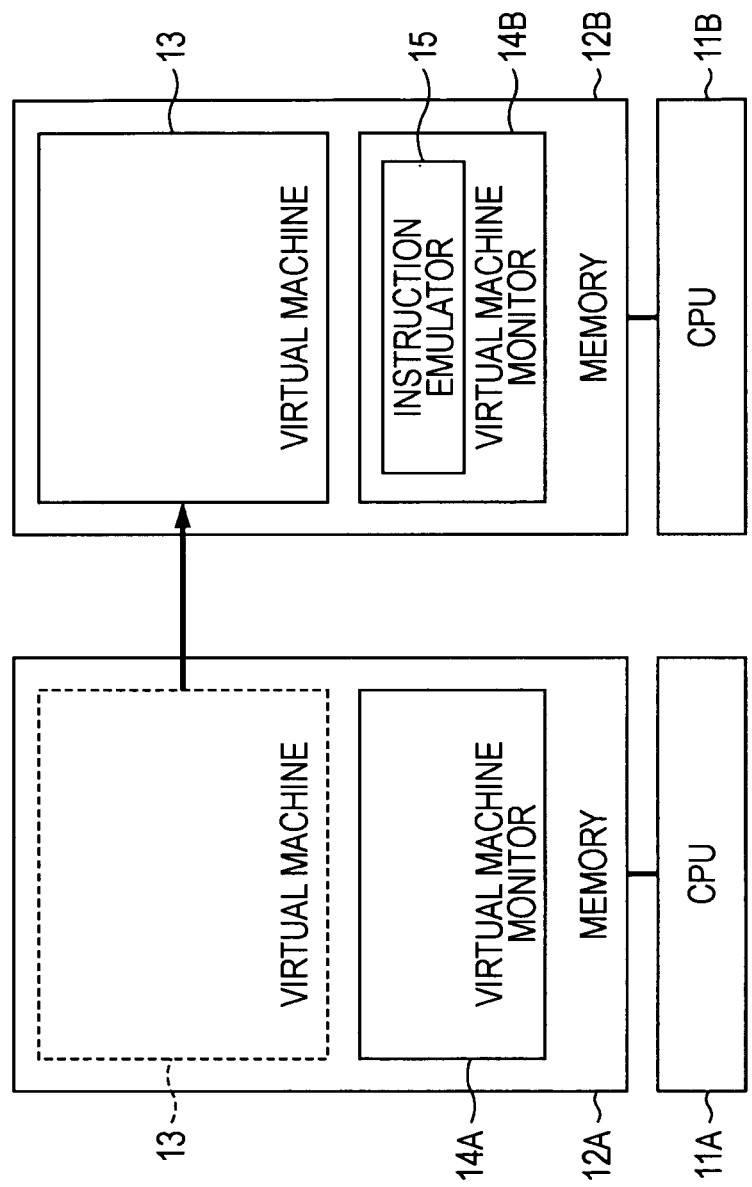
FIG. 2 is a block diagram illustrating a virtual machine that has migrated in the system of FIG. 1.

Referring to FIG. 2, the virtual machine 13 may now be migrated from the memory 12A to the memory 12B.

The virtual machine 13 moves from the memory 12A to the memory 12B through the migration process, but the program executed by the virtual machine 13 is constructed of the instructions of the instruction set A. Through the migration process, however, the virtual machine 13 is moved to the memory 12B connected to the CPU 11B implementing the instruction set B.

More specifically, the program of the virtual machine 13 is executed through the capability of the CPU 11B. Although the common instruction can be executed through the capability of the CPU 11B as previously discussed, the CPU 11B has difficulty in executing the instructions other than the common instruction.

Subsequent to the migration process, the program of the virtual machine 13 operates as described below in response to the instruction.

The common instruction as a major portion of the program of the virtual machine 13 is executed through the capability of the CPU 11B.

An instruction not carried out through the capability of the CPU 11B, i.e., an instruction other than the common instruction, is transferred from the virtual machine 13 to the virtual machine monitor 14B. The instruction emulator 15 in the virtual machine monitor 14B converts the instruction other than the common instruction (not common instruction) into an instruction of the instruction set B. The instruction converted by the instruction emulator 15 is executed through the capability of the CPU 11B in a fashion equivalent to a fashion that the not common instruction is executed through the capability of the CPU 11A. The instructions the CPU 11B does not execute include an instruction to check the type of a CPU (such as a CPUID instruction of Intel Corporation, hereinafter simply referred to as a CPUID instruction), and the instruction X.

With this arrangement, the information processing apparatus of the first embodiment provides the following advantages.

The CPU 11A may be a high-end CPU but with high power consumption. The CPU 11B may be a low-end CPU but with lower power consumption.

In such a case, the virtual machine 13 may be migrated from the memory 12A having the high-power consuming CPU 11A connected thereto to the memory 12B having the low-power consuming CPU 11B connected thereto without interrupting the program.

An instruction operating at a high-end throughput is executed through the capability of the CPU 11A and an instruction not calling for a high-end throughput is executed through the capability of the CPU 11B. With this arrangement, the information processing apparatus of the first embodiment embodies a system that achieves high-end performance and low-power consumption features.

Figure 3:
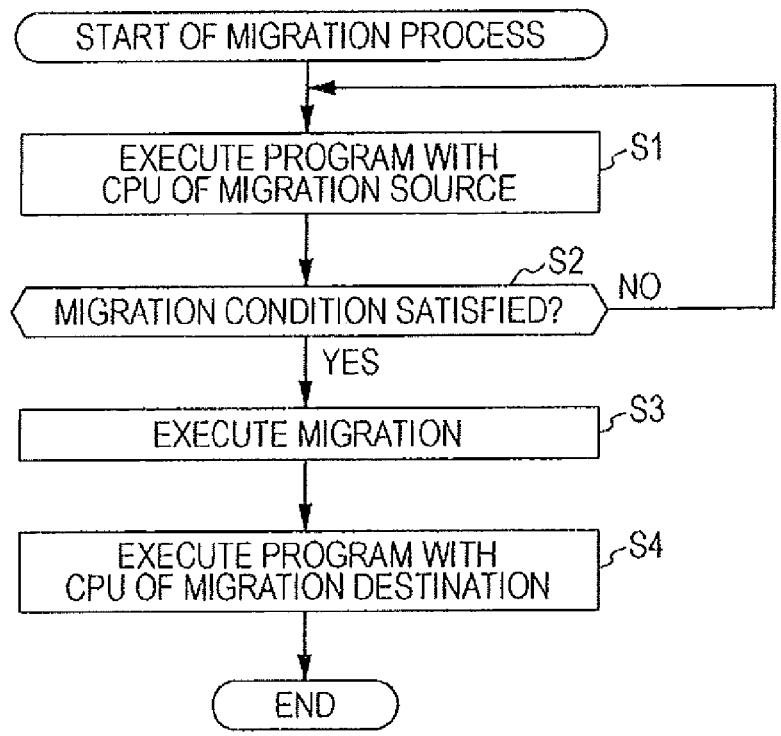
FIG. 3 is a flowchart illustrating a migration process of the first embodiment.

FIG. 3 is a flowchart illustrating the migration process of the virtual machine 13 from the memory 12A to the memory 12B discussed with reference to FIG. 2.

The CPU 11A connected to the memory 12A on which the virtual machine 13 was present prior to the migration is referred to as a migration source CPU 11A. The CPU 11B connected to the memory 12B to which the virtual machine 13 has moved through the migration process is referred to as a migration destination CPU 11B.

In step S1, the virtual machine 13 executes the program through the capability of the migration source CPU 11A.

In step S2, the migration source CPU 11A determines whether a migration condition is satisfied. For example, the migration condition is that a user has issued a migration instruction. Also, for example, if a high-end CPU 11A is executing a high-end instruction, and a next instruction calls for no high-end throughput, a migration condition may be determined to be satisfied.

If no migration condition is satisfied with no branch followed in step S2, processing returns to step S1 to repeat step S1 and subsequent steps.

Steps S1 and S2 are cycled through until the migration condition is satisfied with the program of the migration source CPU 11A executed.

If the migration condition is satisfied with yes branch followed in step S2, processing proceeds to step S3.

In step S3, the migration source CPU 11A executes a migration process. More specifically, referring to FIG. 2, the virtual machine 13 is migrated from the memory 12A to the memory 12B.

In step S4, the virtual machine 13 executes the program through the capability of the migration destination CPU 11B, and the migration process ends. The process of the program execution performed by the virtual machine 13 through the capability of the migration destination CPU 11B is described with reference to FIG. 4.

Figure 4:
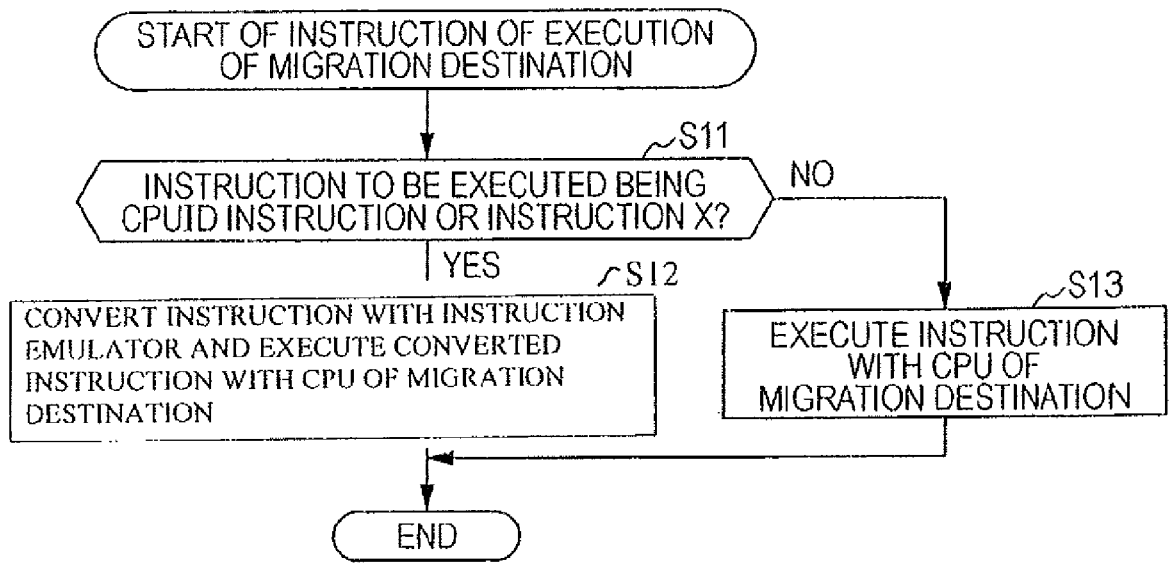
FIG. 4 is a flowchart illustrating an instruction execution process at a migration destination in accordance with the first embodiment.

FIG. 4 is a flowchart of the program executed by the virtual machine 13 through the capability of the migration destination CPU 11B in step S4 of the migration process of FIG. 3. The process is hereinafter referred to as an instruction execution process at the migration destination.

In step S11, the migration destination CPU 11B determines whether an instruction to be executed is a CPUID instruction or an instruction X. Alternatively, in step 11 the migration destination CPU 11B determines whether an instruction to be executed is a common instruction.

If the instruction to be executed is neither the CPUID instruction nor the instruction X, i.e., the instruction to be executed is a common instruction with no branch followed in step S11. Processing proceeds to step S13.

In step S13, the virtual machine 13 executes the instruction through the capability of the migration destination CPU 11B, and the process ends.

If the instruction to be executed is either the CPUID instruction or the instruction X, yes branch is followed in step S11. Processing proceeds to step S12.

In step S12, the instruction emulator 15 converts the instruction (the CPUID instruction or the instruction X) into an instruction of the instruction set B. Further in step S12, the virtual machine 13 executes the instruction converted by the instruction emulator 15 through the capability of the migration destination CPU 11B.

If the instruction is either the CPUID instruction or the instruction X, the instruction emulator 15 converts the instruction. The virtual machine 13 executes the converted instruction and the major instructions through the capability of the CPU 11B.

In accordance with the first embodiment, the instruction emulator 15 does not convert all the instructions. The instruction emulator 15 converts an instruction to be executed only when the instruction to be executed is not common to the instruction set executed through the capability of the migration destination CPU 11B (the instruction X or the CPUID instruction). The instruction to be executed converted by the instruction emulator 15 is executed through the capability of the migration destination CPU 11B. The information processing apparatus of the first embodiment shortens time for the emulation process. As a result, the information processing apparatus of the first embodiment executes the virtual machine 13 efficiently prior to and subsequent to the migration of the virtual machine 13.

The first embodiment of the present invention has been discussed with reference to FIGS. 1 through 4. A second embodiment of the present invention is described below with reference to FIG. 5.

3. Second Embodiment

Figure 5:
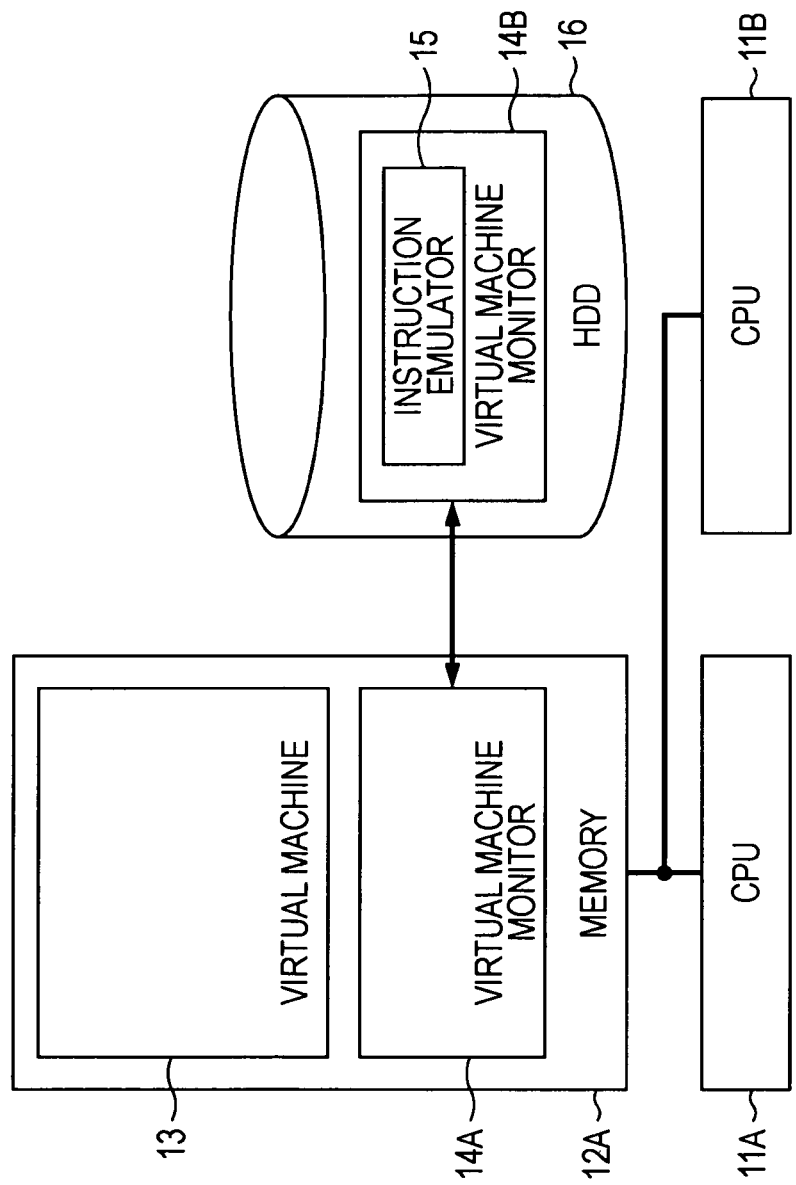
FIG. 5 is a block diagram illustrating an information processing apparatus in accordance with a second embodiment of the present invention.

FIG. 5 illustrates a functional structure of an information processing apparatus of a second embodiment of the present invention, different from the structure of the information processing apparatus illustrated in FIG. 1.

Referring to FIG. 5, elements identical to those illustrated in FIG. 1 are designated with the same reference numerals and the discussion thereof is omitted here as appropriate.

The information processing apparatus illustrated in FIG. 5 may be partitioned into a plurality of units housed in separate cases. In accordance with the second embodiment, however, the information processing apparatus is a single unit housed in a single case.

The information processing apparatus illustrated in FIG. 5 includes CPU 11A, CPU 11B, memory 12A, and HDD 16. The memory 12A is shared by the CPU 11A and the CPU 11B. The HDD includes the virtual machine monitor 14B having the instruction emulator 15. The virtual machine monitors 14A and 14B can interchangeably be substituted for each other between the memory 12A and the HDD 16.

The virtual machine 13 is migrated in this arrangement through the process steps described below.

The virtual machine monitor 14A is evacuated into the HDD 16 other than the memory 12A. The virtual machine monitor 14B is then moved to the memory 12A. The virtual machine 13 is thus migrated.

In other words, the virtual machine 13 is migrated by transferring the virtual machine monitor 14A to the HDD 16, and the virtual machine monitor 14B to the memory 12A. The program of the virtual machine 13 is executed through the capability of the CPU 11B subsequent to the migration process.

The second embodiment of the present invention has been discussed with reference to FIG. 5.

4. Third Embodiment

The first and second embodiments emulate only the instruction X absent on the migration destination CPU 11B as described above, thereby executing efficiently the migration of the virtual machine 13.

In contrast, in a third embodiment of the present invention, a program including the instruction X is suspended prior to the execution of the migration. In accordance with the third embodiment, only a program including the common instruction is migrated, and a program including the instruction X is not migrated. The program including the instruction X is resumed again by the migration destination CPU 11B subsequent to the migration process.

In other words, only the program including the common instruction is migrated and is then continuously executed on the migration destination in the third embodiment. The program including the instruction X is suspended prior to the migration process, and then resumed again on the migration destination.

Figure 6:
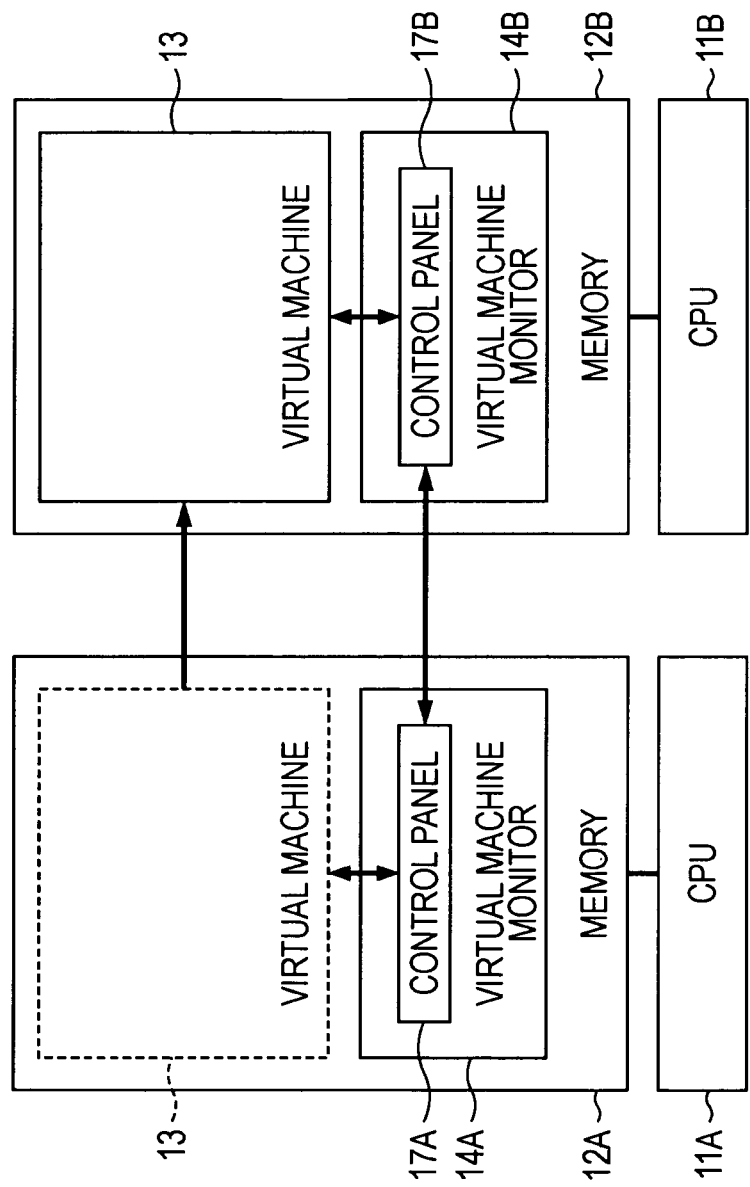
FIG. 6 is a block diagram of an information processing apparatus in accordance with a third embodiment of the present invention.

FIG. 6 is a functional block diagram of a structure of the information processing apparatus in accordance with the third embodiment of the present invention, different from the structure illustrated in FIG. 1.

Referring to FIG. 6, elements identical to those illustrated in FIG. 1 are designated with the same reference numerals and the discussion thereof is omitted here as appropriate.

The information processing apparatus of FIG. 6 may be constructed of a plurality of units. In accordance with the present embodiment, however, the information processing apparatus is a single unit housed in a single case.

The information processing apparatus of FIG. 6 includes the virtual machine monitor 14A including a control panel 17A. The virtual machine monitor 14B includes a control panel 17B.

The virtual machine monitors 14A and 14B can control the respective virtual machines 13 thereof. The virtual machine monitors 14A and 14B, and the virtual machine 13 are controlled by interfaces of the control panels 17A and 17B.

The control panels 17A and 17B are programs implementing functions controlling the virtual machine monitors 14A and 14B, and the virtual machine 13. The control panels 17A and 17B can communicate with each other via a network or the like.

The virtual machines 13 can mutually access the control panels 17A and 17B.

Figure 7:
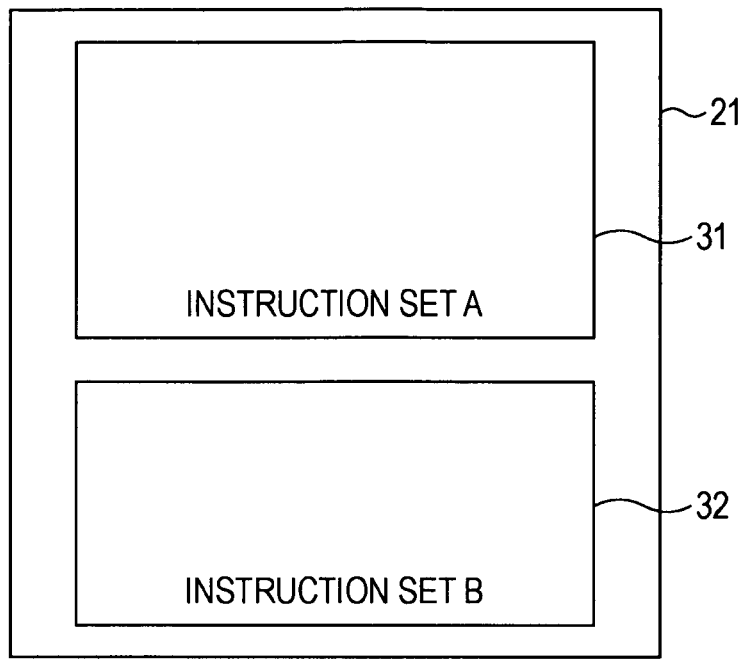
FIG. 7 illustrates the structure of a program.
Figure 8:
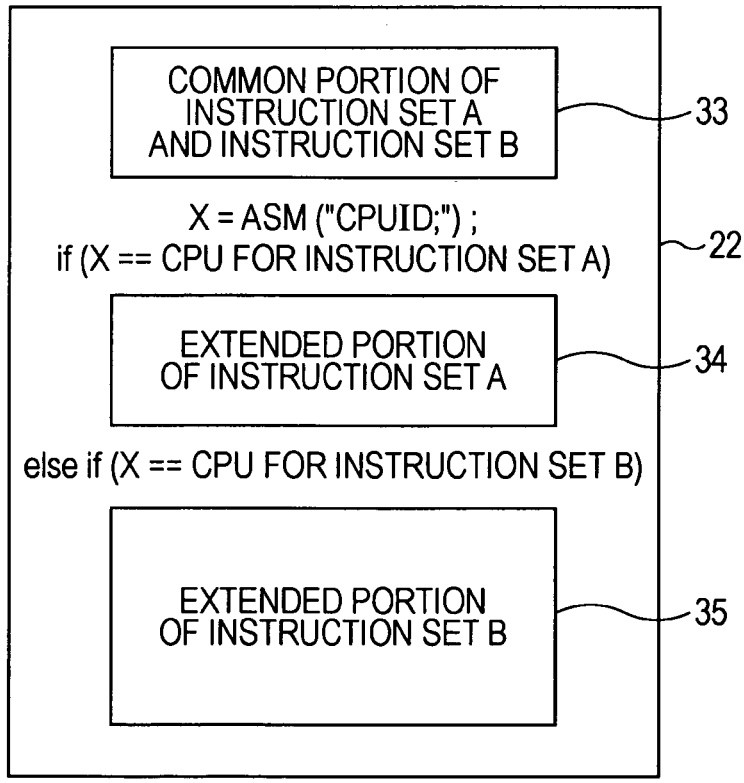
FIG. 8 illustrates the structure of a program different from the structure of the program of FIG. 7.

FIGS. 7 and 8 illustrate a structure of program 21 executed by the information processing apparatus of the third embodiment.

FIG. 7 illustrates the structure in which an instruction string 31 composed of an instruction set A and an instruction string 32 composed of an instruction set B, out of the program 21 executed by the information processing apparatus of the third embodiment, are simply juxtaposed. An example of the program illustrated in FIG. 7 is a universal binary that operates with each of Power PC (Registered Trademark of IBM) and x86 (Registered Trademark of Intel Corporation).

FIG. 8 illustrates the program 22 executed by the information processing apparatus of the third embodiment. The program 22 illustrated in FIG. 8 is a typical program including the instruction set A and the instruction set B sharing major instructions with a part of the other instructions thereof being different.

The program 22 illustrated in FIG. 8 includes an instruction string 33 as a portion common to both the instruction set A and the instruction set B. Furthermore, the program 22 illustrated in FIG. 8 includes an instruction string 34 as an extended portion of the instruction set A. The instruction string 34 as the extended portion of the instruction set A is an instruction string including an instruction that is present in the instruction set A but absent in the instruction set B. The program 22 illustrated in FIG. 8 includes an instruction string 35 as an extended portion of the instruction set B. The instruction string 35 as the extended portion of the instruction set B is an instruction string including an instruction that is present in the instruction set B but absent in the instruction set A.

In view of the structure of the program commonly sharing the major instructions with a partially different instruction set, the structure of FIG. 8 is smaller in program size than the structure of FIG. 7. In the discussion that follows, the third embodiment employs the program having the structure illustrated in FIG. 8.

The program illustrated in FIG. 8 includes an instruction x=ASM("CPUID;") to check the type of each CPU.

The instruction set different from CPU to CPU is executed in each instruction string branched depending on the value of the results of the CPUID instruction, for example, in the instruction string 34 as the extended portion of the instruction set A and the instruction string 35 as the extended portion of the instruction set B.

More specifically, if the type of the CPU is found to be the CPU 11A in response to an if instruction (X=CPU for the instruction set A), the instruction of the instruction string 34 as the extended portion of the instruction set A is executed. If the type of the CPU is found to be the CPU 11B in response to an else if instruction (X=CPU for the instruction set B), the instruction of the instruction string as the extended portion of the instruction set B is executed.

The program executed by the information processing apparatus of the third embodiment has been discussed with reference to FIGS. 7 and 8. In accordance with the third embodiment as described above, the program including an instruction that is difficult for the migration destination CPU 11B to execute is not migrated. To migrate the virtual machine 13, whether the program of the virtual machine 13 includes an instruction difficult for the migration destination CPU 11B to execute is to be determined.

A method of determining whether an instruction difficult for the migration destination CPU 11B to execute is present is described below.

Two types of methods, i.e., a static method and a dynamic method are available to determine whether an instruction difficult for the migration destination CPU 11B to execute is present.

In the static method, the program is reverse-engineered to determine whether the program includes a CPUID instruction or an X instruction.

In the dynamic method, whether the CPUID instruction or the instruction X has been executed or not is determined.

The determination methods of determining whether the program can be migrated or not include a static method, a dynamic method, and a combination thereof.

The migration is possible prior to the execution of the instruction x=ASM("CPUID;") in the program of FIG. 8. Subsequent to the execution of the instruction x=ASM ("CPUID;") and prior to the execution of the if sentence, the migration is possible by executing the instruction x=ASM ("CPUID;") after the migration. However, the migration becomes difficult subsequent to the execution of an instruction in the instruction string of the if sentence (the instruction string as the extended portion of the instruction set A as illustrated in FIG. 8).

In accordance with the third embodiment, the combination of the static method and the dynamic method is adopted as described below. More specifically, for the CPUID instruction, the information processing apparatus determines whether the CPUID instruction has been executed, and for the instruction X, the information processing apparatus reverse-engineers the instruction X.

The program executed by the information processing apparatus of FIG. 6 has been discussed with reference to FIGS. 7 and 8.

Figure 9:
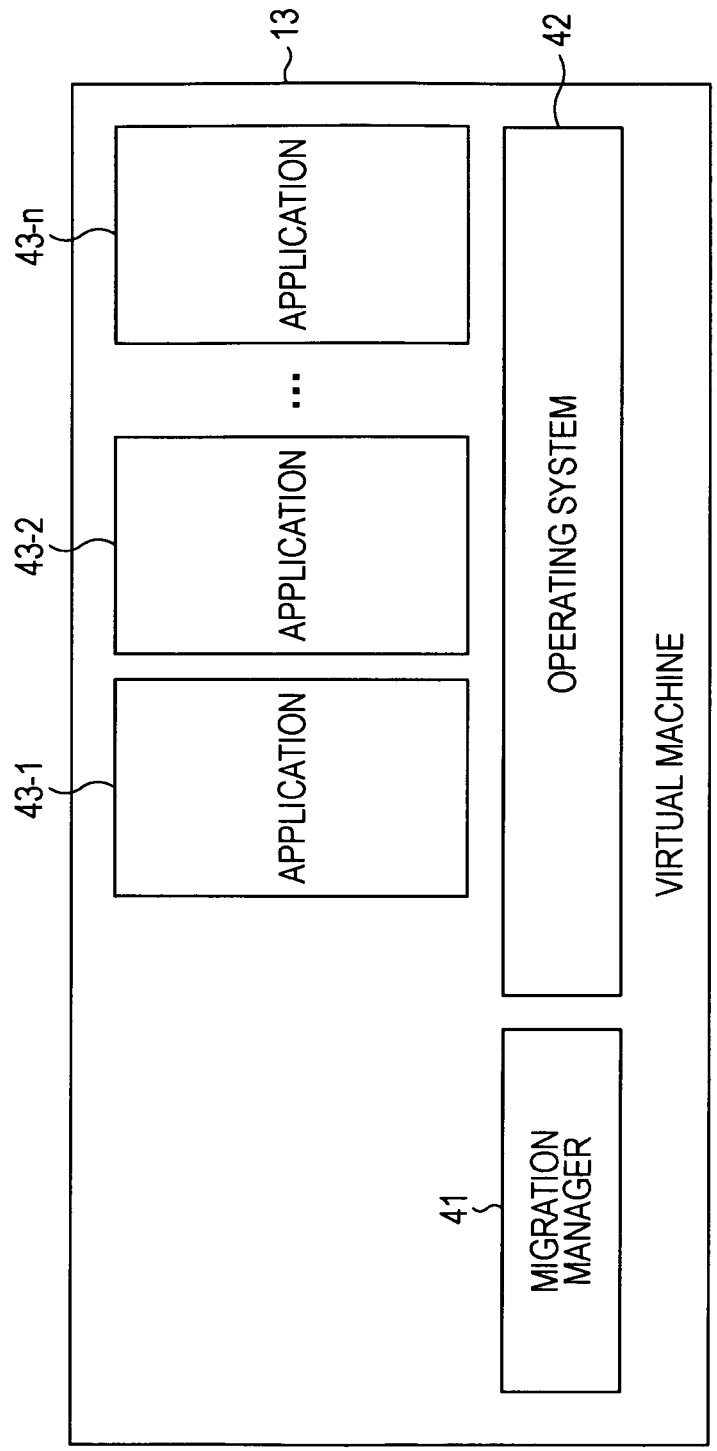
FIG. 9 is a block diagram illustrating a structure of a virtual machine in accordance with the third embodiment of the present invention.

FIG. 9 illustrates in detail the virtual machine 13 of FIG. 6.

The virtual machine 13 includes a migration manager 41, an operating system 42, and application programs 43-1 through 43-n.

The migration manager 41 is a module for controlling the migration process. The migration manager 41 remains operative. The migration manager 41 performs a series of control steps for migration. The migration manager 41 is described in detail later with reference to FIG. 10.

The migration system 42 runs on the virtual machine 13. It is noted that the operating system 42 is composed of the common instructions.

The application programs 43-1 through 43-n (n is 1 or larger integer) are programs running on the virtual machine 13. If it is not necessary to discriminate each of the application programs 43-1 through 43-n, the application programs 43-1 through 43-n are collectively referred to as an application program 43. The application program 43 is executed by the operating system 42.

Figure 10:
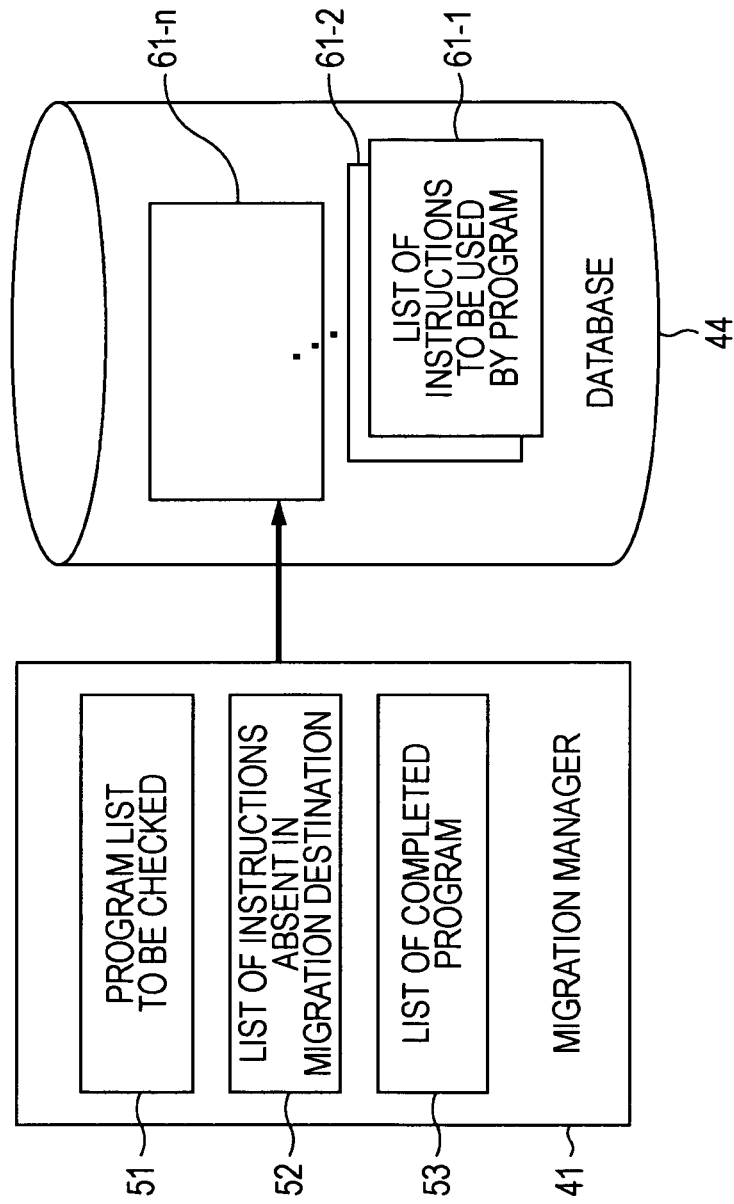
FIG. 10 is a block diagram illustrating a migration manager and a database in accordance with the third embodiment of the present invention.

FIG. 10 illustrates in detail the structure of the migration manager 41, and a database 44 communicating with the migration manager 41.

The migration manager 41 includes a check target program list 51 (of programs to be checked), an absent-instruction list 52 (of instructions absent on a migration destination), a completed program list 53 (of completed programs), etc. Theses lists are described in detail later.

The migration manager 41 examines instructions present in all the programs on the virtual machine 13. More specifically, the migration manager 41 reverse-engineers each program prior to the execution of the program, and then produces a list of instructions present in the program.

The lists thus produced are stored on the database as instruction lists 61-1 through 61-n (n is an integer equal to or larger than 1) to be used by the program. The database 44 may be present on a file system or on a network. It is important that the database 44 be present at a location which the migration manager 41 can reference.

The instruction lists 61-1 through 61-n to be used by the programs are produced for the respective programs present on the virtual machine 13. More specifically, the number of instruction lists 61-1 through 61-n to be used by the programs is equal to the number of programs present on the virtual machine 13. If it is not necessary to discriminate the instruction lists 61-1 through 61-n to be used by the programs (n is an integer equal to or larger than 1), these instruction lists are collectively referred to as an instruction list 61 to be used by the program.

The instruction list 61 to be used by the program is produced at any timing regardless of the execution of the migration. The migration manager 41 can produce the instruction list 61 to be used by the program, at any appropriate timing prior to the instruction of the execution of the migration. Subsequent to the instruction of the execution of the migration, the migration manager 41 can produce the instruction list 61 immediately prior to the execution of the migration.

The migration manager 41 can reference the database 44 at any time. By referencing the instruction list 61 to be used by the program, the migration manager 41 can quickly learn an instruction used in the program as an execution target.

In the case of FIG. 10, the instruction list 61 to be used by the program is stored on the database 44. The storage location of the instruction list 61 to be used by the program is not limited to the location illustrated in FIG. 10. For example, the instruction list 61 to be used by the program may be encoded and embedded in the header of the program.

Described below are the check target program list 51 on the migration manager 41, the absent-instruction list 52 of instructions absent on a migration destination, and the completed program list 53 of completed programs.

The check target program list 51 includes a listing of information identifying a program having issued a CPUID instruction.

The migration manager 41 monitors all the programs present on the virtual machine 13. More specifically, the migration manager 41 monitors whether each of the programs has issued the CPUID instruction. If one running program has issued the CPUID instruction, the migration manager 41 grasps the CPUID instruction, and adds, to the check target program list 51, information identifying that program. The check target program list 51 is updated in this way.

If the execution of the program added to the check target program list 51 has been completed, the migration manager 41 deletes that program from the check target program list 51.

The instruction list 52 of instructions absent on the migration destination includes an instruction that the migration manager 41 finds on the migration source CPU 11A but that the migration manager 41 fails to find on the migration destination CPU 11B.

The completed program list 53 includes a program that the migration manager 41 completed beforehand prior to the migration. The programs that the migration manager 41 completed beforehand include a program that is difficult to migrate, i.e., a program that includes an instruction absent on the migration destination. The program listed in the completed program list 53 is initiated through the capability of the migration destination CPU 11B subsequent to the migration process.

The information processing apparatus of the third embodiment thus constructed continues to execute the program having only the common instructions regardless of the migration. The information processing apparatus stops the program having an instruction other than the common instructions prior to the migration, and resumes the program using the common instructions only through the capability of the migration destination CPU 11B.

The advantages described below are provided in a system including the CPU 11A as a high-end but high-power consuming CPU and the CPU 11B as a low-end but low-power consuming CPU.

The information processing apparatus of the third embodiment continues to execute the program composed of the common instructions only regardless of the migration. If the program includes an instruction other than the common instructions, the information processing apparatus re-initiates the program subsequent to the migration. Any instruction other than the common instructions is not executed on the CPU 11B. The information processing apparatus of the third embodiment can thus migrate efficiently the virtual machine 13 from the high-end, high-power consuming CPU to the low-end, low-power consuming CPU.

Figure 11:
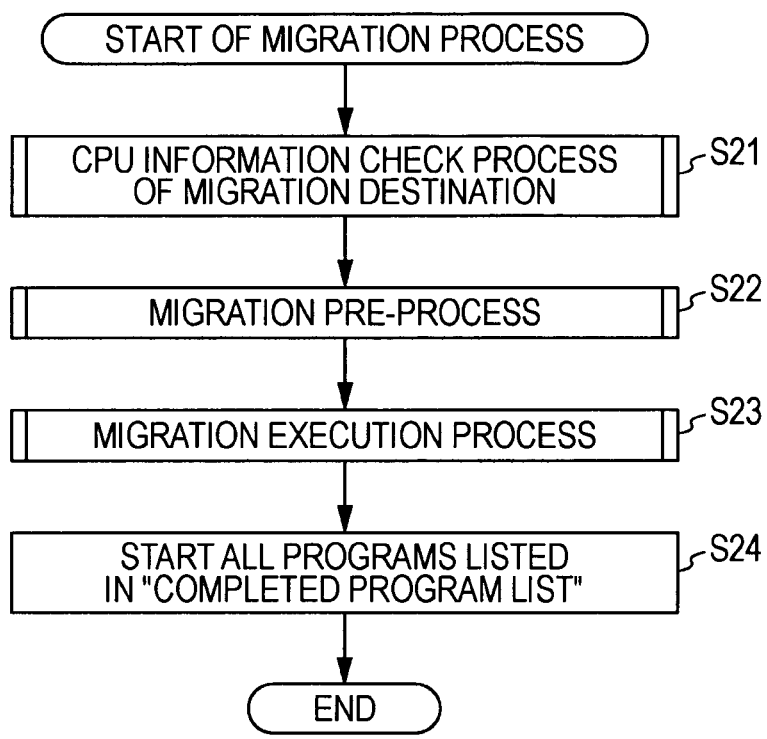
FIG. 11 is a flowchart illustrating a migration process in accordance with the third embodiment of the present invention.

FIG. 11 is a flowchart illustrating a migration process in which the virtual machine 13 is migrated from the memory 12A to the memory 12B as previously discussed with reference to FIG. 6.

In step S21, the migration manager 41 examines the migration destination CPU 11B prior to the migration. This process is hereinafter referred to as a CPU information check process of the migration destination. The CPU migration check process of the migration destination is described in detail with reference to FIG. 12.

In step S22, the migration manager 41 performs a migration pre-process. In the migration pre-process, the migration manager 41 determines whether a program as a process target is a migratable program or not, and if the process target is an unmigratable program, issues an instruction to quit the unmigratable program. The migration pre-process is described in detail later with reference to FIG. 13.

In step S23, the migration manager 41 migrates the virtual machine 13 from the memory 12A to the memory 12B. Such a process is referred to as a migration execution process. The migration execution process is described later in detail with reference to FIG. 14.

In step S24, the migration manager 41 starts up all the programs listed in the completed program list 53. The migration process of the third embodiment of the present invention is thus complete.

Figure 12:
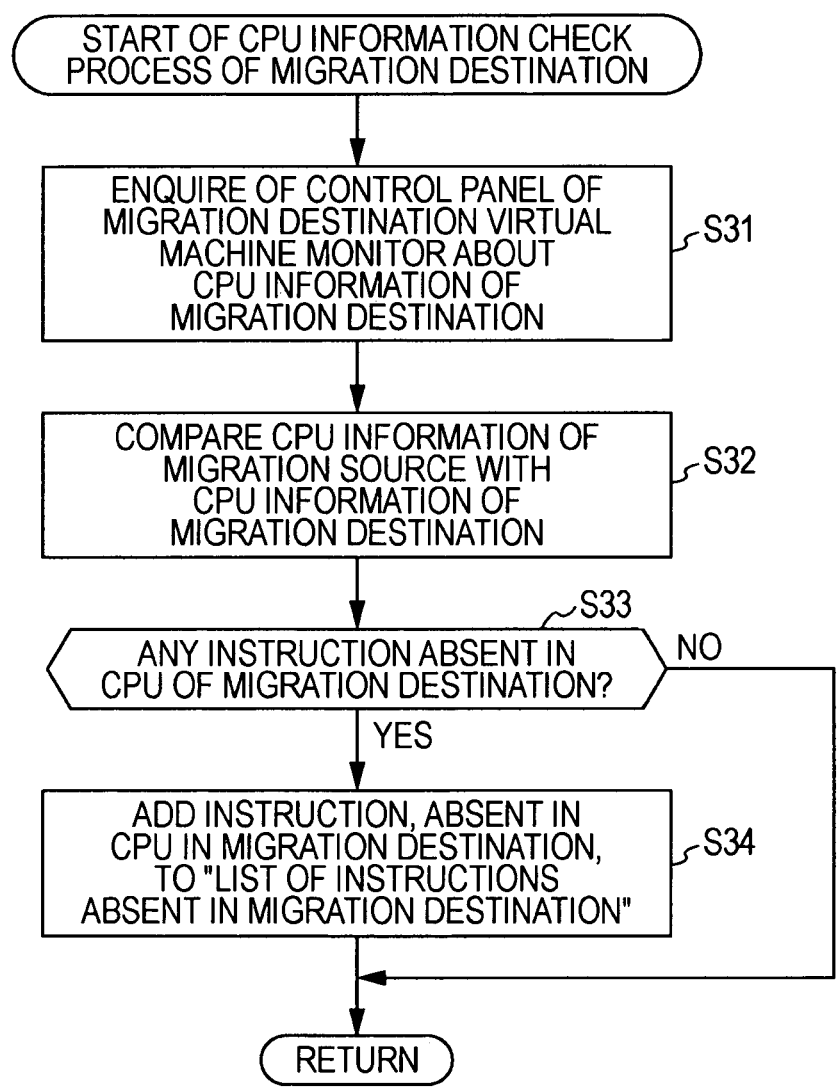
FIG. 12 is a flowchart illustrating a CPU information check process performed at a migration destination.

FIG. 12 is a flowchart illustrating in detail the CPU information check process of the migration destination in step S21 of the migration process of FIG. 11.

In step S31, the migration manager 41 inquires of the control panel 17B of the virtual machine monitor 14B as the migration destination about CPU information of the migration destination via the control panel 17A. The CPU information includes information relating to an instruction implemented by the migration destination CPU 11B.

In step S32, the migration manager 41 compares CPU information of the migration source with CPU information of the migration destination. The migration manager 41 acquires the CPU information of the migration source and the CPU information of the migration destination via the control panels 17A and 17B.

In step S33, the migration manager 41 determines whether any instruction absent on the migration destination CPU 11B is present.

If no instruction absent on the migration destination CPU 11B is present with no branch followed in step S33, the CPU information check process of the migration destination ends.

If any instruction absent on the migration destination CPU 11B is present with yes branch followed in step S33, processing proceeds to step S34.

In step S34, the migration manager 41 adds an instruction absent on the migration destination CPU 11B to the absent-instruction list 52 of instructions absent on the migration destination.

The CPU information check process of the migration destination is thus complete. More specifically, the process step in step S21 of FIG. 11 is now complete. The migration pre-process in step S22 starts as illustrated in FIG. 13.

Figure 13:
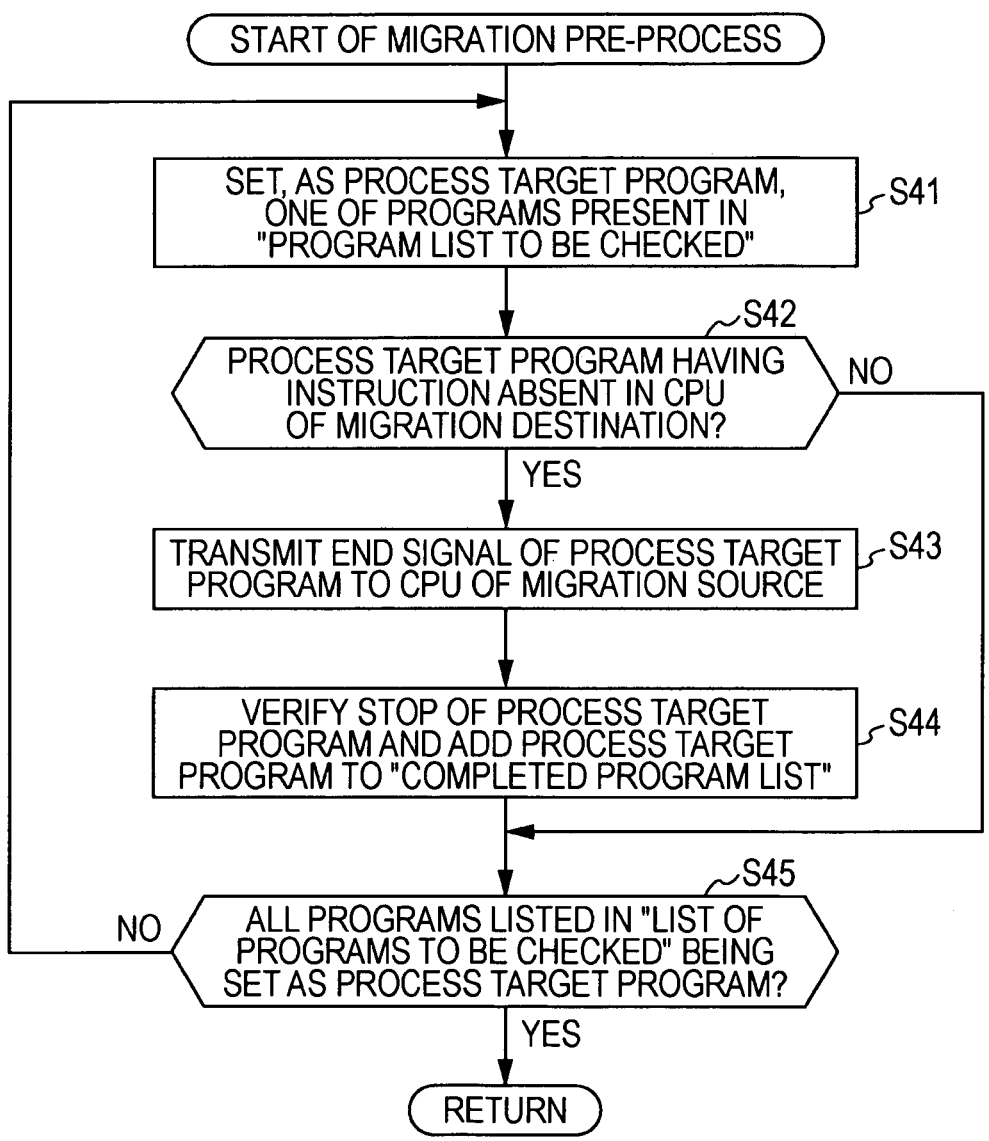
FIG. 13 is a flowchart illustrating a migration pre-process.

FIG. 13 is a flowchart illustrating in detail the migration pre-process in step S22 of the migration process of FIG. 11.

In step S41, the migration manager 41 sets as a process target program one of the programs present in the check target program list 51. As previously discussed, the check target program list 51 includes a listing of information identifying a program having issued the CPUID instruction.

In step S42, the migration manager 41 determines whether the process target program includes an instruction upresent on the migration destination. More specifically, by referencing the absent-instruction list 52 of programs absent on the migration destination, the migration manager 41 determines whether the process target program has an instruction absent on the migration destination.

If the process target program has no instruction absent on the migration destination with no branch followed in step S42, processing proceeds to step S45. Step S45 and subsequent steps are described later.

If the process target program includes an instruction absent on the migration destination with yes branch followed in step S42, processing proceeds to step S43.

In step S43, the migration manager 41 transmits an end signal of the process target program to the migration source CPU 11A. More specifically, the migration manager 41 ends the process target program prior to the migration in a manner such that the process target program including the instruction absent on the migration destination is not migrated.

In step S44, the migration manager 41 verifies that the process target program has stopped, and adds the process target program onto the completed program list 53.

In step S45, the migration manager 41 determines whether all the programs on the check target program list 51 have been set as process target programs.

If it is determined that not all the programs on the check target program list 51 have been set as process target programs with no branch followed in step S45, processing returns to step S41 to repeat step S41 and subsequent steps.

Steps S41-S44 are cycled through until all the programs on the check target program list 51 have been set as process target programs. In other words, the check target program list 51 determines whether each of the programs on the check target program list 51 includes an instruction absent on the migration destination. A program having an instruction absent on the migration destination is added to the completed program list 53.

If it is determined that all the programs on the check target program list 51 have been set as process target programs with yes branch followed in step S45, processing ends.

The migration pre-process thus ends. Step S22 illustrated in FIG. 11 is thus complete followed by the migration execution process in step S23 illustrated in FIG. 14.

Figure 14:
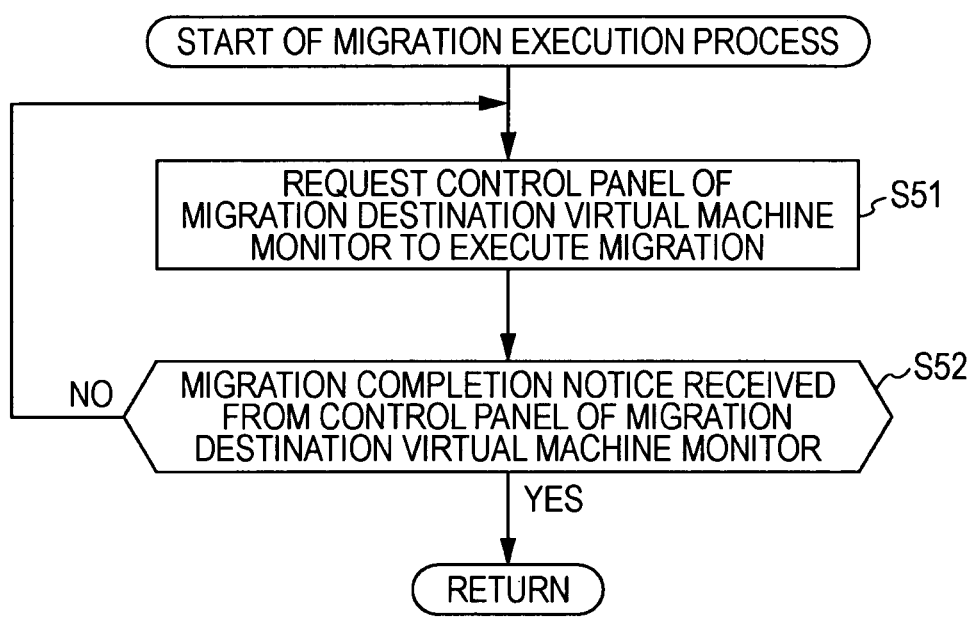
FIG. 14 is a flowchart illustrating an execution process of migration.

FIG. 14 is a flowchart illustrating in detail the migration execution process in step S23 of the migration process of FIG. 11.

In step S51, the migration manager 41 requests the control panel 17B of the virtual machine monitor 14B of the migration destination to execute the migration.

If the control panel 17B is requested to execute the migration, the virtual machine monitor 14B migrates the virtual machine 13 from the memory 12A to the memory 12B. Subsequent to the completion of the migration, the virtual machine monitor 14B notifies the migration manager 41 of a migration completion notice.

In step S52, the migration manager 41 determines whether a migration completion notice has been received from the control panel 17B of the virtual machine monitor 14B as the migration destination.

If the migration manager 41 has not received a migration completion notice from the control panel 17B of the virtual machine monitor 14B as the migration destination, no branch is followed in step S52. Processing returns to step S51.

The migration execution process waits on standby until the migration manager 41 has received a migration completion notice from the control panel 173 of the virtual machine monitor 14B as the migration destination.

If the migration manager 41 has received a migration completion notice from the control panel 17B of the virtual machine monitor 14B as the migration destination, yes branch is followed in step S52. Processing thus ends.

The migration execution process is complete in step S23 of FIG. 11, followed by step S24.

The information processing apparatus of the present embodiment provides the advantages described below.

The information processing apparatus of the present embodiment migrates the virtual machine 13 between the CPUs 11A and 11B commonly sharing the major instructions thereof but with a part of the instructions different from each other without interrupting the program of the virtual machine 13.

For example, the CPU 11A is a high-end and high-power consuming CPU, and the CPU 11B is a low-end and low-power consuming CPU.

The information processing apparatus of each of the first and second embodiments executes through the capability of the CPU 11A an instruction program to be performed at a high throughput, and executes through the capability of the CPU 11B an instruction program not calling for a high throughput. With this arrangement, the information processing apparatus of each of the first and second embodiments of the present invention makes a system that provides both the high-performance and low-power consumption features.

The information processing apparatus of the third embodiment executes on the CPU 11A a program including an instruction that can be executed by only the CPU 11A, and executes a program including only the common instructions through the capability of the CPU 11B. With this arrangement, the information processing apparatus of the third embodiment of the present invention makes a system that provides both the high-performance and low-power consumption features.

The information processing apparatus of each of the first through third embodiments allows low-cost hardware to be added to an existing system and migrates the virtual machine 13 to the resulting hardware.

If high-end hardware is added on an existing system in accordance with the information processing apparatus of each of the first through third embodiments, the migration process is performed on the existing hardware while a high-end function is being used. The existing system is thus effectively used.

The migration is performed within one apparatus in the above-described embodiments. Alternatively, the migration process may be performed between two apparatuses. In the specification, the word system refers to the whole system including a plurality of apparatuses and a controller.

The above-described process steps may be implemented using hardware or software. If the process steps are implemented using software, a program forming the software is installed on a computer. The computers include a computer included in a dedicated hardware system, and a general-purpose personal computer that performs a variety of functions with a variety of programs installed thereon.

FIG. 15 is a block diagram illustrating a hardware structure of a computer that performs the above-described process steps.

In the computer, CPUs 101 and 102, read-only memory (ROM) 103, random-access memory (RAM) 104 are interconnected to each other via a bus 105.

The bus 105 is connected to an input-output interface 106. Also connected to the input-output interface 106 are an input unit 107, output unit 108, storage unit 109, communication unit 110, and drive 111.

The input unit 107 includes a keyboard, a mouse, a microphone, etc. The output unit 108 includes a display, a loudspeaker, etc. The storage unit 109 includes a hard disk, a non-volatile memory, etc. The communication unit 110 includes a network interface, etc. The drive 111 drives a removable medium 112, such as a magnetic disc, an optical disc, or a semiconductor memory, which may be considered a non-transitory recording medium.

The CPUs 101 and 102 in the computer thus constructed perform the above-described series of process steps by loading a program from the storage unit 109 onto the RAM 104 via the input-output interface 106 and the bus 105, and then executing the program.

The program to be executed by the CPUs 101 and 102 is supplied on the removable medium 112 as a package medium. The program may also be supplied using wired or wireless transmission media, such as a local-area network (LAN), the Internet, or a digital broadcasting satellite.

The program may be installed onto the storage unit 109 in the computer through the input-output interface 106 by loading the removable medium 112 onto the drive 111. The program may be received by the communication unit 110 via wired or wireless transmission media, and then installed onto the storage unit 109. The program may also be pre-installed onto the ROM 103 or the storage unit 109.

The program may be executed by the computer with the process steps in the time-series order previously described or with several process steps in parallel or at an appropriate timing at which a call is made.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for processing information, the apparatus comprising:
a processor operable to determine whether a migration condition exists for migrating, from a source information processing unit to a destination information processing unit, an instruction to be executed of a program, wherein whether the migration condition is determined to exist is based on a determination of a type of processing capability of the source information processing unit and the destination information processing unit and a type of processing capability called for by the instruction to be executed, to determine whether the instruction to be executed of the program is a predetermined instruction when a migration condition is determined to exist, and to be an instruction emulator to convert the instruction to be executed of the program to be executable by the destination information processing unit, only when the instruction to be executed is determined to be the predetermined instruction,
wherein the source information processing unit includes a first CPU which implements a first instruction set, the destination information processing unit includes a second CPU which implements a second instruction set, the predetermined instruction is an instruction that is present in the first instruction set but is absent from the second instruction set so that the destination information processing unit does not have a capability to execute the predetermined instruction, and the instruction emulator, only when an instruction to be executed of the first instruction set is determined to be the predetermined instruction, converts the instruction to be executed of the first instruction set into at least one instruction that is present in the second instruction set.

2. The apparatus of claim 1, wherein when the instruction to be executed of the program is present in both the first and second instruction sets, the instruction to be executed of the program is determined not to be the predetermined instruction and, when the migration condition is determined to exist, the instruction to be executed of the program is executed only through the processing capability of the destination information processing unit.

3. The apparatus of claim 1, wherein the predetermined instruction is an instruction that is executable by the first CPU to check a type of a processing capability but is not executable by the second CPU.

4. A method for processing information, comprising:
using a processor to carry out the following:
determining whether a migration condition exists for migrating, from a source information processing unit to a destination information processing unit, an instruction to be executed of a program, wherein whether the migration condition is determined to exist is based on a determination of a type of processing capability of the source information processing unit and the destination information processing unit and a type of processing capability called for by the instruction to be executed,
when a migration condition is determined to exist, determining whether the instruction to be executed of the program is a predetermined instruction, and only when the instruction to be executed of the program is determined to be the predetermined instruction, the instruction to be executed is converted by an instruction emulator,
wherein the source information processing unit includes a first CPU which implements a first instruction set, the destination information processing unit includes a second CPU which implements a second instruction set, the predetermined instruction is an instruction that is present in the first instruction set but is absent from the second instruction set so that the destination information processing unit does not have a capability to execute the predetermined instruction, and the instruction emulator, only when an instruction to be executed of the first instruction set is determined to be the predetermined instruction, converts the instruction to be executed of the first instruction set into at least one instruction that is present in the second instruction set.

5. The method of claim 4, wherein when the instruction to be executed of the program is present in both the first and second instruction sets, the instruction to be executed of the program is determined not to be the predetermined instruction and, when the migration condition is determined to exist, and the instruction to be executed of the program is executed only through the processing capability of the destination information processing unit.

6. The method of claim 4, wherein the predetermined instruction is an instruction that is executable by the first CPU to check a type of a processing capability but is not executable by the second CPU.

7. A system, comprising:
a source information processing unit having a first processor operable to implement a first instruction set to execute a program;
a destination information processing unit having a second processor operable to implement a second instruction set; and
a further processor operable to determine whether a migration condition exists for migrating, from a source information processing unit to a destination information processing unit, an instruction to be executed of the program, wherein whether the migration condition is determined to exist is based on a determination of a type of processing capability of the source information processing unit and the destination information processing unit and a type of processing capability called for by the instruction to be executed, to determine whether the instruction to be executed of the program is a predetermined instruction when a migration condition is determined to exist, and to be an instruction emulator to convert the instruction to be executed of the program to be executable by the destination information processing unit, only when the instruction to be executed is determined to be the predetermined instruction, wherein the predetermined instruction is an instruction that is present in the first instruction set but is absent from the second instruction set so that the destination information processing unit does not have a capability to execute the predetermined instruction, and the instruction emulator, only when an instruction to be executed of the first instruction set is determined to be the predetermined instruction, converts the instruction to be executed of the first instruction set into at least one instruction that is present in the second instruction set.

8. A non-transitory recording medium recorded with a computer-readable program for a processor to carry out a method of processing information, the method comprising:

determining whether a migration condition exists for migrating, from a source information processing unit to a destination information processing unit, an instruction to be executed of a program, wherein whether the migration condition is determined to exist is based on a determination of a type of processing capability of the source information processing unit and the destination information processing unit and a type of processing capability called for by the instruction to be executed;

when a migration condition is determined to exist, determining whether the instruction to be executed of the program is a predetermined instruction; and only when the instruction to be executed of the program is determined to be the predetermined instruction, the instruction to be executed is converted by an instruction emulator, wherein the source information processing unit includes a first CPU which implements a first instruction set, the destination information processing unit includes a second CPU which implements a second instruction set, the predetermined instruction is an instruction that is present in the first instruction set but is absent from the second instruction set so that the destination information processing unit does not have a capability to execute the predetermined instruction, and the instruction emulator, only when an instruction to be executed of the first instruction set is determined to be the predetermined instruction, converts the instruction to be executed of the first instruction set into at least one instruction that is present in the second instruction set.

9. The non-transitory recording medium of claim 8, wherein when the instruction to be executed of the program is present in both the first and second instruction sets, the instruction to be executed of the program is determined not to be the predetermined instruction and, when the migration condition is determined to exist, the instruction to be executed of the program is executed only through the processing capability of the destination information processing unit.

10. The non-transitory recording medium of claim 8, wherein the predetermined instruction is an instruction that is executable by the first CPU to check a type of a processing capability but is not executable by the second CPU.

11. The apparatus of claim 1, wherein if the instruction to be executed of the program is the predetermined instruction, the processor prevents the migration of the instruction to be executed of the program from the source information processing unit to the destination information processing unit.

12. The method of claim 4, wherein if the instruction to be executed of the program is the predetermined instruction, the migration of the instruction to be executed of the program from the source information processing unit to the destination information processing unit is prevented.

13. The system of claim 7, wherein if the instruction to be executed of the program is the predetermined instruction, the further processor prevents the migration of the instruction to be executed of the program from the source information processing unit to the destination information processing unit.

14. The non-transitory recording medium of claim 8, wherein if the instruction to be executed of the program is the predetermined instruction, the migration of the instruction to be executed of the program from the source information processing unit to the destination information processing unit is prevented.

15. The apparatus of claim 1, wherein the predetermined instruction is other than an instruction to check a type of a processing capability.

* * * * *